(12) United States Patent
Reicks et al.

(10) Patent No.: US 6,343,526 B2
(45) Date of Patent: Feb. 5, 2002

(54) TRACTOR STEERING WHEEL GRIP

(76) Inventors: David Reicks; Dana Reicks, both of Rte. 1, Box 79, Lebanon, KS (US) 66952

( * ) Notice: Subject to any disclaimer, the term of this patent is extended or adjusted under 35 U.S.C. 154(b) by 0 days.

(21) Appl. No.: 09/849,811

(22) Filed: May 4, 2001

Related U.S. Application Data

(63) Continuation of application No. 09/148,217, filed on Sep. 4, 1998, now abandoned.

(51) Int. Cl.$^7$ ................................................. B62D 1/04
(52) U.S. Cl. ....................................................... 74/557
(58) Field of Search ........................... 74/557, 543, 544, 74/545, 546; D12/177

(56) References Cited

U.S. PATENT DOCUMENTS

| | | |
|---|---|---|
| 1,135,615 A | 4/1915 | Rathmann |
| 1,503,348 A | 7/1924 | Bruhn |
| 1,511,523 A | 10/1924 | Rucker |
| 1,614,417 A | 1/1927 | Whipple |
| 1,735,783 A | 11/1929 | Oliver, Sr. |
| 1,861,586 A | 6/1932 | Shipley |
| 1,866,111 A | 7/1932 | Jones |
| 2,118,573 A | 5/1938 | Sinko ............................ 74/557 |
| D141,293 S | 5/1945 | Throp .......................... D14/30 |
| 2,425,055 A | 8/1947 | Taylor ........................... 74/557 |
| 2,441,061 A | 5/1948 | Deer ............................. 74/557 |
| 2,549,774 A | 4/1951 | Chambers ..................... 74/557 |
| 3,100,120 A | 8/1963 | Cleary ...................... 280/87.01 |
| 3,196,709 A | 7/1965 | Bickford ....................... 74/557 |
| 5,289,736 A | 3/1994 | Fujimori ....................... 74/557 |
| 5,520,071 A | 5/1996 | Jones ........................... 74/557 |

FOREIGN PATENT DOCUMENTS

SU    464471    6/1975    ................. 74/557

*Primary Examiner*—Mary Ann Green
(74) *Attorney, Agent, or Firm*—Zarley, McKee, Thomte, Voorhees & Sease; Dennis L. Thomte

(57) ABSTRACT

A tractor steering wheel grip comprising a clamp secured to the rim of the steering wheel and having a post projecting therefrom. A hand grip is rotatably secured to the post which is gripped by the operator of the tractor. The hand grip comprises a base portion which rotatably receives the post, a first leg portion which extends from the base portion at substantially a right angle to the longitudinal axis of the post, an arcuate portion extending from the first leg portion, and an elongated hand gripping portion extending from the arcuate portion. The first leg portion, arcuate portion and the elongated hand gripping portion define a substantial U-shape.

3 Claims, 2 Drawing Sheets

TRACTOR STEERING WHEEL GRIP

CROSS-REFERENCE TO RELATED APPLICATION

This is a continuation application of Petitioners' earlier application Ser. No. 09/148,217 filed Sep. 4, 1998, entitled "A TRACTOR STEERING WHEEL GRIP", now abandoned.

BACKGROUND OF THE INVENTION

1. Field of the Invention

This invention relates to a vehicle steering wheel grip and more particularly to a tractor steering wheel grip.

2. Description of the Related Art

Many types of auxiliary hand grips for steering wheels have been provided and the devices are commonly referred to as "spinners". The conventional spinner normally includes some sort of clamping device which is clamped onto the rim of the steering wheel and which has a knob rotatably mounted thereon so that the steering wheel may be easily turned by the operator by simply grasping the knob and turning the steering wheel through the use thereof. Although the conventional spinners do seem to work generally satisfactorily for trucks and automobiles, the same do not work well when they are used on tractor steering wheels. Normally, it takes considerably more leverage to turn a tractor steering wheel than an automobile steering wheel and the operator's hand becomes tired quite rapidly when a spinner is being used.

SUMMARY OF THE INVENTION

A tractor steering wheel grip is provided comprising a clamp which is clamped to the rim of the steering wheel and which has a post protruding therefrom. A hand grip is rotatably secured to the post and includes a base portion which rotatably receives the post, a first leg portion which extends from the base portion at substantially a right angle to the longitudinal axis of the post, an arcuate portion extending from the first leg portion, and an elongated hand gripping portion extending from the arcuate portion. The first leg portion, arcuate portion and hand gripping portion define a substantial U-shape. Preferably, the underside of the hand gripping portion includes indentations formed therein which receive the fingers of the operator.

It is therefore a principal object of the invention to provide an improved tractor steering wheel grip.

A further object of the invention is to provide a tractor steering wheel grip which comprises a clamp secured to the rim of the steering wheel and a U-shaped hand gripping portion rotatably mounted to the post.

A further object of the invention is to provide a tractor steering wheel grip which reduces hand and wrist strain.

Still another object of the invention is to provide a tractor steering wheel grip which is convenient to use and which is safe to use.

These and other objects will be apparent to those skilled in the art.

DESCRIPTION OF THE PREFERRED EMBODIMENT

Figure 1:
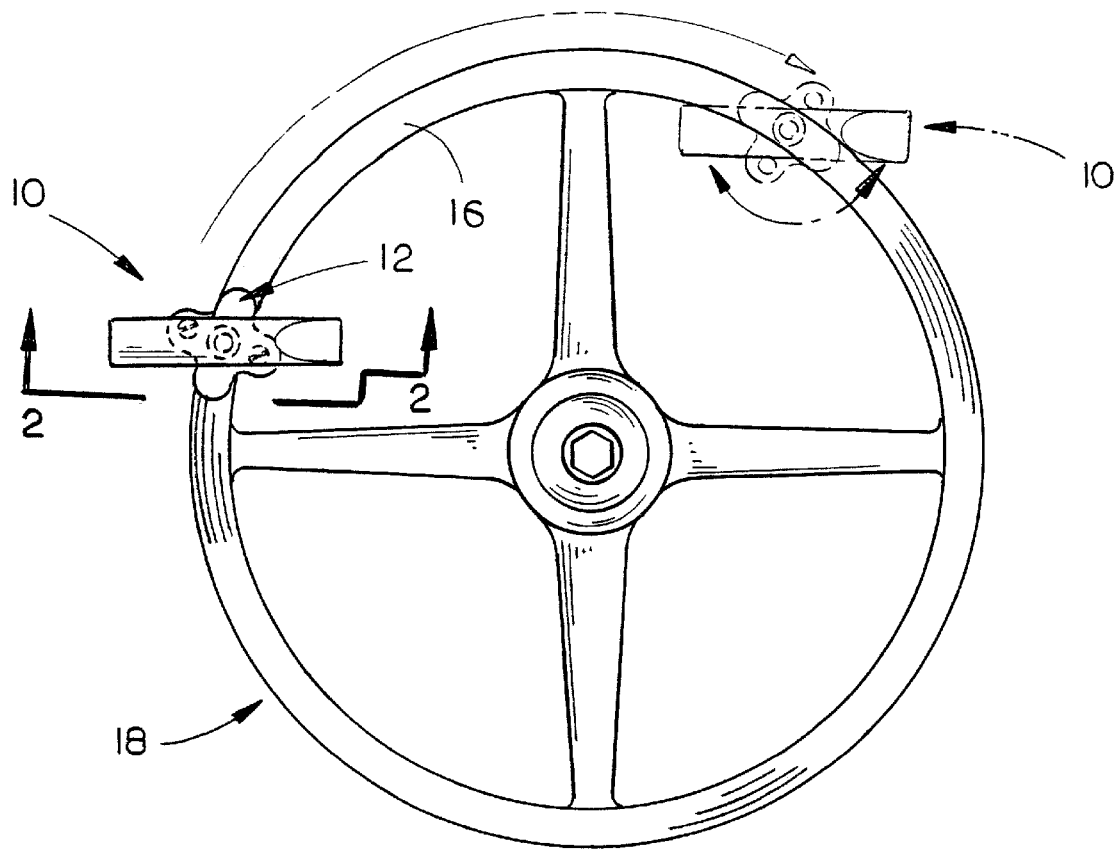
FIG. 1 is an elevational view of a tractor steering wheel having the steering wheel grip secured thereto with the broken lines illustrating the grip having been moved from the full line position.

The tractor steering wheel grip of this invention is referred to generally by the reference numeral 10 which includes a conventional clamp 12 having a post 14 extending therefrom. Clamp 12 is secured to the rim 16 of a tractor steering wheel 18 in conventional fashion.

Figure 2:
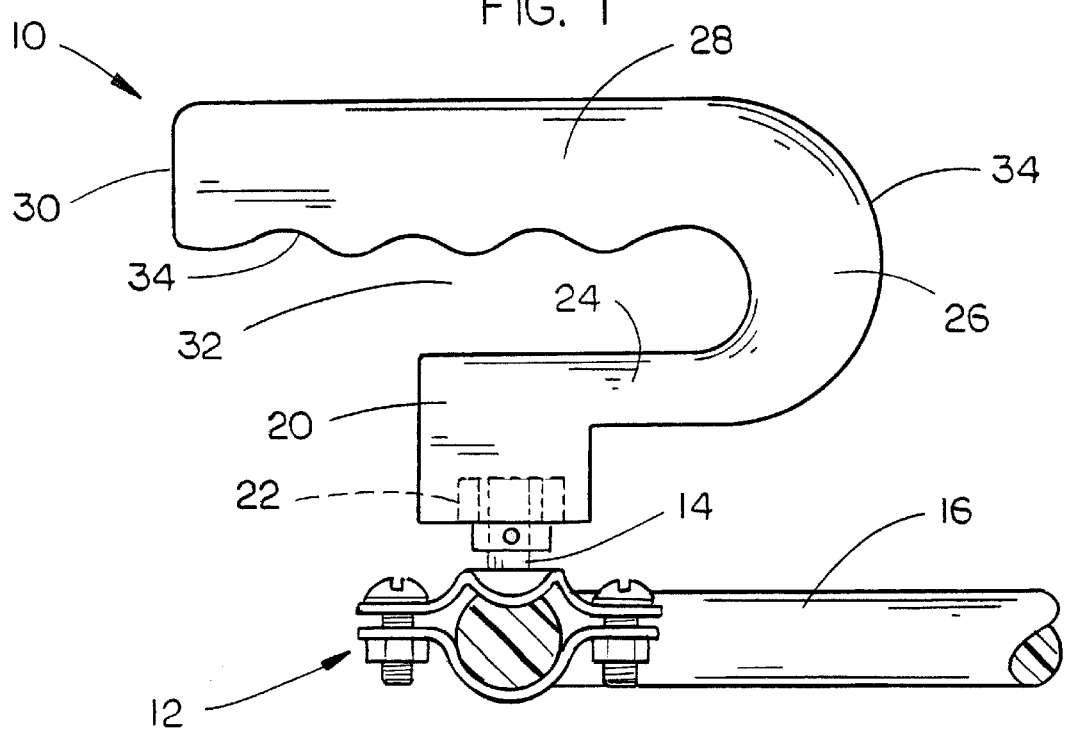
FIG. 2 is an enlarged sectional view as seen on lines 2—2 of FIG. 1.
Figure 3:
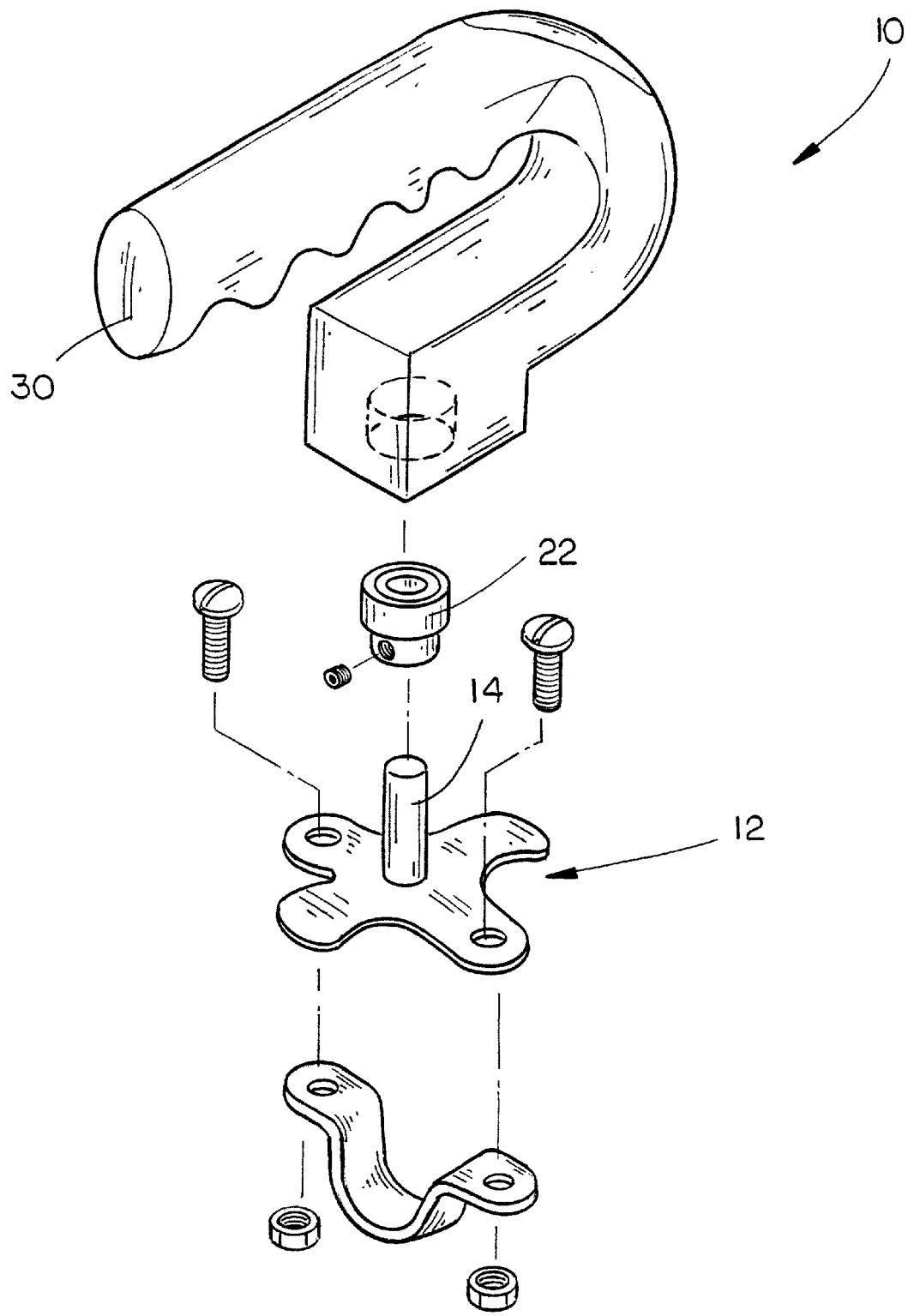
FIG. 3 is an exploded perspective view of the steering wheel grip of this invention.

Tractor steering wheel 10 includes a base portion 20 which rotatably receives the post 14. Base portion 20 may be secured to the post 14 in a number of different ways and it is preferred that a bearing 22 be utilized. A first leg portion 24 extends from base portion 20 at substantially a right angle to the longitudinal axis of the post 14 and terminates in an arcuate section 26. Arcuate section 26 terminates in a hand gripping portion 28 having an end 30 which protrudes beyond base portion 20, as illustrated in FIG. 2. Hand gripping portion 28 is spaced from base portion 20 and first leg portion 24 to create a space 32 therein adapted to receive the fingers of the operator. The underside of hand gripping portion 28 is provided with spaced-apart indentations 34 adapted to receive the fingers of the operator.

In use, it is recommended that the clamp 12 be secured to the rim 16 of the steering wheel 18 at approximately 9:00 o'clock or 10:00 o'clock, as seen in FIG. 1. Normally, the end portion 30 of hand gripping portion 28 will extend outwardly from the rim 16, so that opening 32 faces outwardly, although the operative position of the hand gripping portion 28 will be a matter of personal preference.

The tractor operator will grip the hand gripping portion 28 with his or her fingers being received in the indentations 34 to provide a safe gripping surface. Although it is a matter of preference, the operator will normally place his or her thumb on the exterior surface 34 of the arcuate portion 26. The U-shape of the device enables the operator to safely and comfortably grip the same and to steer the tractor without subjecting the operator's hand to undue stress and strain.

Although the device is particularly well-suited for use on a tractor steering wheel, it may be used on any type of steering wheel.

Thus it can be seen that the invention accomplishes at least all of its stated objectives.

We claim:

1. In combination:

a steering wheel including a rim;

a post having a first and second end;

said first end of said post being secured to said rim of said steering wheel and projecting therefrom;

and a substantially U-shaped hand grip rotatably secured to said second end of said post;

said hand grip including an elongated gripping portion which has a longitudinal axis disposed substantially transversely to the longitudinal axis of said post.

2. In combination:

a steering wheel including a rim;

a post having a first and second end;

said first end of said post being secured to said rim of said steering wheel and projecting therefrom;

and a hand grip rotatably secured to said second end of said post;

said hand grip including a first portion which rotatably receives said post, a first leg portion which extends from said first portion at substantially a right angle to the longitudinal axis of said post, an arcuate portion extending from said first leg portion, and an elongated hand gripping portion extending from said arcuate portion, said hand gripping portion having opposite ends and having a longitudinal axis disposed substantially transversely to the longitudinal axis of the post, said opposite ends of said hand gripping portion being disposed laterally of said first portion and said post; said first leg portion, said arcuate portion and said hand gripping portion substantially defining a U-shape.

3. The combination of claim 2 wherein said hand gripping portion has finger receiving indentations formed therein which face towards said first leg portion.

* * * * *